United States Patent [19]

Schwarz et al.

[11] 4,345,876
[45] Aug. 24, 1982

[54] ROTOR STRUCTURE FOR A ROTARY WING AIRCRAFT

[75] Inventors: Alois Schwarz, Putzbrunn; Karl-Heinz Mautz, Ottobrun; Michael Stephan, Munich, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 114,236

[22] Filed: Jan. 21, 1980

[30] Foreign Application Priority Data

Jan. 31, 1979 [DE] Fed. Rep. of Germany ....... 2903524

[51] Int. Cl.$^3$ ............................................. B64C 27/38
[52] U.S. Cl. ................................ 416/134 A; 416/141; 416/230
[58] Field of Search ........... 416/134 A, 138 A, 140 A, 416/141, 230 A

[56] References Cited

U.S. PATENT DOCUMENTS

| | | | |
|---|---|---|---|
| 3,261,407 | 7/1966 | Culver et al. | 416/134 A |
| 3,885,887 | 5/1975 | Desjardins | 416/141 |
| 3,999,887 | 12/1976 | McGuire | 416/134 A |
| 4,053,258 | 10/1977 | Mouille | 416/134 A |
| 4,087,203 | 5/1978 | Ferris | 416/138 A X |
| 4,222,709 | 9/1980 | Mouille | 416/141 |
| 4,227,859 | 10/1980 | Gouzien et al. | 416/134 A |
| 4,244,677 | 1/1981 | Noehren et al. | 416/141 X |

FOREIGN PATENT DOCUMENTS 2701519 7/1978 Fed. Rep. of Germany ... 416/134 A

*Primary Examiner*—Everette A. Powell, Jr.
*Attorney, Agent, or Firm*—W. G. Fasse; D. F. Gould

[57] ABSTRACT

The wings of a rotary wing aircraft comprise, for example, four wing blades forming two pairs of wing blades whereby the blades of a pair are located diametrically opposite each other. The blades of a pair are connected to each other by a spar extending from wing blade to wing blade. The spar is operatively secured to the rotor head. Each spar has between the rotor head and the respective wing blade a zone with a torsion yieldability larger than in the spar outside said zone. A beam stiff against bending, bridges the zone, referred to as a torque soft zone, from the wing blade toward the rotor head except for a small flexible section between the rotor head and the radially inner end of the beam. The flexible section permits the blade flapping movements and the blade lead-lag movements.

8 Claims, 3 Drawing Figures

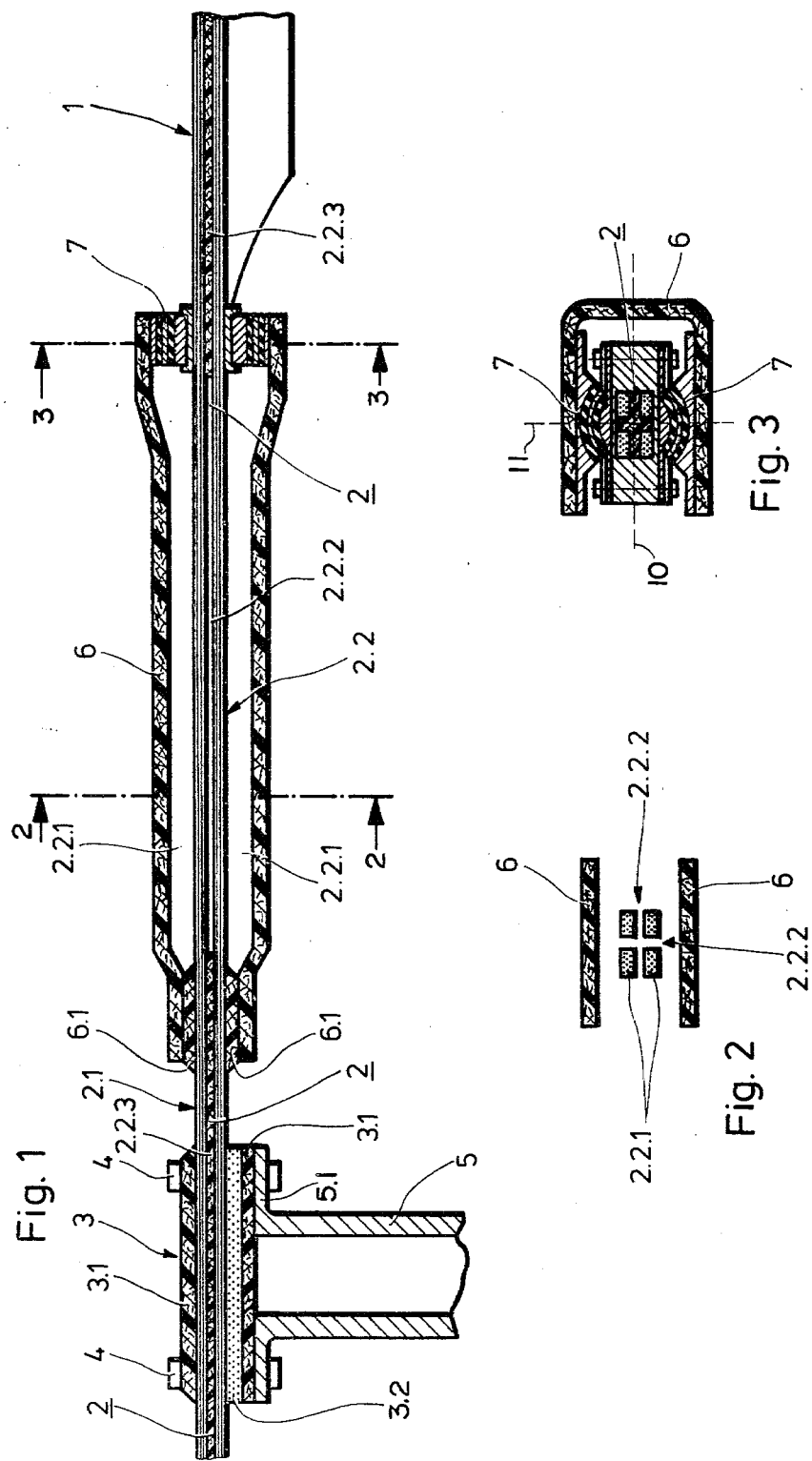

ROTOR STRUCTURE FOR A ROTARY WING AIRCRAFT

BACKGROUND OF THE INVENTION

The present invention relates to a rotor structure for a rotary wing aircraft. More specifically, the invention relates to a rotor having an even number of rotor blades secured to the rotor head in pairs so that the rotor blades of a pair are arranged diametrically opposite each other. The members of a pair are interconnected by a common spar extending from one blade root of a pair to the other blade root of a pair, as an integral structure. The spar is sufficiently yielding to torsion loads resulting from blade angle movements. In other words, the spar is torsion soft. Similarly, the spar is sufficiently yielding against bending loads resulting from blade flapping movements and from blade lead-lag movements. German Patent Publication (DE-OS) 2,755,557 discloses a rotor without any defined flapping hinges and without any lead-lag hinges for the rotor blades. In such a structure the bending moments resulting from the blade flapping and from the blade lead-lag movements are transmitted to the rotor head through the spar member. Relatively soft zones of the spar contribute to relieving the rotor blades of these moments. In such rotor structures it cannot be avoided that the blade angle adjustments cause a twisting of the spar member because the latter necessarily has a different height and width due to stiffness considerations. As a result, such twisting causes a change in the bending stiffness of the spar member in the zone that is twisted. Such zone extends from the respective blade wing to the connecting point of the spar to the rotor head. As a result, in this type of rotor having a common spar member for each pair of rotor blades, the blade angle adjustment movements affect the blade flapping movements and the blade lead-lag movements in such a manner that the ficticious flapping hinge spacing and the ficticious lead-lag hinge spacing from the rotor head vary in response to the blade angle adjustment. Accordingly, this type of prior art rotor has the disadvantage of an undefined vibration characteristic. Strong vibrations may occur with the result that the rotor and the aircraft cabin or fuselage are subjected to high loads.

German Patent Publication (DE-OS) 2,701,519 describes a rotor structure in which the wing blades are also interconnected in pairs by spar members made of fiber reinforced synthetic material whereby the fiber strands extend in the longitudinal direction of the blades and spar members.

OBJECTS OF THE INVENTION

In view of the above it is the aim of the invention to achieve the following objects singly or in combination:

to provide a rotor of the type described above which is so constructed that a mutual influence of the blade angle adjustment movements on the one hand and of the blade flapping movements as well as the blade lead-lag movements on the other hand, is eliminated without the use of mechanical blade flapping hinges and without any mechanical blade lead-lag hinges;

to control the twisting of the interconnecting spar as a result of blade angle movements to such an extent that it will not influence the bending characteristics of the spar in response to flapping movements and lead-lag movements; and to reinforce a spar zone without undesirably influencing the bending characteristics of the spar between the blade root and the rotor head proper.

SUMMARY OF THE INVENTION

According to the invention there is provided a rotor structure of the type described above which is characterized in that the spar means which interconnect two wing blades arranged diametrically opposite to each other are constructed as a single piece, the center of which is rigidly connected to the rotor head. Between the rotor head and the respective wing blades two spar members are formed. Each spar member is divided into a flexible section adjacent to the rotor head and a torque soft zone extending between the respective wing blades and the respective flexible section. The torque soft zone is reinforced by beam means against bending but remains substantially yielding against torque loads to permit the blade angle adjustment movements. The flexible section of each spar member on both sides and adjacent to the rotor head remains flexible relative to bending loads but has a torsion yieldability smaller than the torsion soft zone which is bridged by the bending stiffness increasing beam. In other words, the flexible section has a higher torsion stiffness than the zone reinforced against bending.

It is an advantage of the invention that the described structure is separated into two zones so that the blade angle adjustment movements on the one hand and the blade flapping and blade lead-lag movements on the other hand are practically effective in these separated zones or sections of the spar member. Thus, the influences of these movements are effectively decoupled from one another.

Further, the adjustment forces required for the collective blade angle movements may be reduced because the torsion softness of the zone which is bridged by the bending stiff beam may be developed to an optimal extent. This is so because the bending stiff beam completely takes up the moments and shearing forces that may result from the lift and the resistance encountered by the respective rotor blade or wing blade. The bending stiff beam transmits the resulting moments and shearing forces to the rotor head through the spar section which remains soft relative to bending between the rotor head and the bending stiff beam. Thus, this section functions substantially exclusively as a flapping hinge and as a lead-lag hinge whereas the bridged torsion soft zone permits the blade angle adjustments without affecting the just mentioned functional hinging section. This type of structure as disclosed by the invention obviates the structural reinforcement of the spar in the form of giving the spar a special profile which takes into account the blade flapping moments and the blade lead-lag moments. This in turn has the advantage that the manufacturing of the rotor blades with their spars is substantially simpler than in the prior art.

BRIEF FIGURE DESCRIPTION

In order that the invention may be clearly understood, it will now be described, by way of example, with reference to the accompanying drawings, wherein:

FIG. 1 is a sectional view of a four blade rotor structure whereby the section plane extends vertically through the rotational axis of the rotor head and whereby only a portion of one wing blade and its respective spar means are shown thereby omitting the symmetrically arranged other wing blade of a pair having a common spar;

FIG. 2 is a sectional view along section line 2—2 in FIG. 1; and

FIG. 3 is a sectional view along section line 3—3 in FIG. 1 showing the structure of the radial bearings securing the stiffening member to the blade root.

DETAILED DESCRIPTION OF PREFERRED EXAMPLE EMBODIMENTS AND OF THE BEST MODE OF THE INVENTION

The present rotor as shown in FIG. 1 has four rotor wing blades of which the wing blade 1 is shown in FIG. 1. The blade wing is adjusted relative to a plane extending normal to the plane of the drawing in accordance with a blade angle adjustment angle. A spar 2 which is common to both blades or rather, to both wing blades, operatively interconnects these wing blades to form an integral component. For example, the rotor blades 1 and the respective spar 2 may be made of fiber reinforced synthetic material, whereby the fiber strands extend in the longitudinal blade direction. The fiber strands may extend from the tip of one blade of the structural component having two blades, to the tip of the other blade of the same component. Intermediate the blades of a pair the strands form the intergral, continuous spar 2. Such a structure is shown in the above mentioned German Patent Publication (DE-OS) 2,701,519. The common spar 2 is tortion soft relative to blade angle movements and it is also flexible, soft against bending relative to blade flapping movements and relative to blade lead-lag movements. Hence, no separate mechanical hinges are necessary for accommodating these blade movements.

FIG. 1 further shows that the common spar 2 is rigidly secured to the rotor head 3 for example by means of a screw connection 4 which simultaneously connects the flange 5.1 of the rotor shaft 5 to the rotor head. The rotor head 3 may comprise stiff plates 3.1 of synthetic material which may be reinforced by a fiber webbing. Further, spacer means 3.2 also comprising synthetic material plates reinforced by a fiber webbing may be used in the rotor head as is conventional.

According to the invention a stiffening member 6 also made of fiber reinforced synthetic material, bridges a portion 2.2 of the spar 2 between the blade 1 and the rotor head 3. Thus, the stiffening member 6 separates the spar member between the rotor head and the blades into two zones. One zone 2.2 is bridged by the stiffening member 6. The other section or zone 2.1 of the spar member 2 extends between the rotor head and the left hand end of the stiffening member 6. Thus, the stiffening member 6 which may be constructed as a sleeve which may have one or two open sides limits the radial extension of the bending soft section 2.1 of the spar 2. Simultaneously, the stiffening member 6 constitutes a carrier beam for the torsion soft zone 2.2 of the spar 2. Such carrier beam or stiffening member 6 is connected in parallel, so to speak, to the torsion soft zone 2.2. The left hand end of the beam member 6 is spaced from the rotor head 3 by the length desired for the flexible zone or section 2.1 and secured to the spar 2, for example, by a screw connection not shown for simplicity's sake but extending through two intermediate layers 6.1 of fiber reinforced synthetic material, thereby providing a rigid connection between the left hand end of the beam member 6 and the spar 2. The right hand end of the beam member 6 extends all the way to the blade root of the blade wing 1 and is also connected to the spar or blade by a suitable connection shown in FIG. 3 as a radial bearing 7.

FIG. 3 shows a sectional view through the connection of the right hand ends of the beam member 6 to the spar or blade by means of the radial bearing 7 made of elastomeric material. While the first mentioned connection with the intermediate layer 6.1 is substantially rigid in the radial direction, which is the longitudinal direction of the blades and of the spar, as well as in the direction perpendicularly to the radial direction, the second connection with the radial bearing 7 is rigid only in the radial direction but yielding in a direction circumferentially around the radial direction. Thus, the beam member 6 provides a stiffening of the zone 2.2 against bending loads but permits, with the aid of the bearing 7, an optimal torsion yielding of the spar zone 2.2. Thus, the zone 2.2 has a substantially higher torsion yielding or torsion softness than the section or zone 2.1 which is not bridged by the beam member 6. Accordingly, the beam member 6 keeps the zone 2.2 substantially free of any bending moments resulting from the blade flapping and from the blade lead-lag movement. On the other hand, the second section or zone 2.1 remains substantially uninfluenced by any blade angle adjustment movements while simultaneously being able to transmit bending moments resulting from blade flapping and/or blade lead-lag movements to the rotor head 3.

The above mentioned separation of each spar member into a bending moment transmitting zone or section 2.1 and into a torsion soft zone 2.2 makes it possible to construct the latter zone 2.2 in an optimal manner relative to the forces necessary for accomplishing the blade angle adjustment. Thus, as shown in FIG. 2 the spar zone 2.2 may be divided into individual strands 2.2.1 thereby forming a total of four such strands 2.2.1 separated by two gaps 2.2.2 extending substantially at right angles relative to each other and intersecting substantially along the longitudinal, radial axis of the spar. Keeping in mind that an optimal torsional softness is to be achieved for the zone 2.2, the gaps 2.2.2 are suitably of such a width that even if the strands 2.2.1 are twisted as a result of a blade angle adjustment, the strands will not contact each other.

As shown, the gaps 2.2.2 may extend from the connection at 6.1 to the radial bearing 7. However, it is also possible to extend the gap from one blade to the other through the spar and fill the gaps with a filler material 2.2.3 except in the zone 2.2. The construction of the spar 2 from separate strands with gaps therebetween is especially advantageous and simple with regard to its production and the filler material 2.2.3 does not make the spar sections completely stiff. The filler material interposed between the strands 2.2.1 may, for example, comprise synthetic resin impregnated webbing layers.

Referring to FIG. 3, the connection between the spar 2 and the beam member 6 is not totally rigid in the radial direction because the radial bearing 7 of elastomeric material permits for an axial play of the spar 2 relative to the bending stiff beam member 6. This feature is advantageous with regard to the so-called centrifugal force lengthening of the spar 2 when the blades are subject to centrifugal forces in operation. Incidentally, the radial bearing 7 may be divided in the horizontal plane 10 or in the vertical plane 11 as shown in FIG. 3.

Forming the beam member 6 as a sleeve which is open at least along one side as shown in FIG. 3 has the advantage that the sleeve may be slipped over the spar 2 without any difficulties.

A further improvement can be achieved by making the sleeve so that it is open along two opposite sides as shown in FIG. 2 except at the points of connection to the spar 2, namely, at 6.1 and where the bearing 7 is located. It has been found that the beam member 6 is substantially free of centrifugal forces since these are taken up by the spar 2. Moreover, the construction of the sleeve with two open sides substantially reduces the size of the control forces necessary for the collective adjustment of the blade angle.

Another advantage of the present structure is seen in that the lever for adjusting the blade angle may be a component of the respective rotor blade 1. Such component for the blade angle adjustment is not shown in the figures, however, it would be connected to the bending stiff beam member 6 in a manner permitting the blade angle adjustment of the blade 1 relative to the beam member 6.

Although the invention has been described with reference to specific example embodiments, it will be appreciated, that it is intended, to cover all modifications and equivalents within the scope of the appended claims.

What is claimed is:

1. A hingeless rotor structure for rotary wing aircraft, comprising rotor head means, an even number of wing blade means forming at least one pair of wing blades, a single length of spar means operatively interconnecting the blade means of a pair, securing means rigidly securing said single length of spar means to said rotor head means, said single length of spar means comprising two members located on opposite sides of the rotor head, each spar member being located between the rotor head and the respective wing blade means, each spar member having a flexible section (2.1) having a given torsion yieldability and a torque soft zone (2.2) extending between the respective wing blade means (1) of a pair of wings and the flexible section (2.1), beam means (6) stiff against bending arranged to bridge the respective torque soft zone, bearing means (7) operatively securing said beam means at the radially outer end thereof to the respective wing blade means for permitting blade angle movements of the respective wing blade and substantially rigid means (6.1) rigidly securing the radially inner end of said beam means (6) to said spar means at a point spaced from said rotor head means so as to leave said flexible section (2.1) of the spar member between said rotor head means and said securing means (6.1), said flexible section (2.1) of the spar member being sufficiently yielding relative to bending loads to permit the blade flapping movements as well as the blade lead-lag movements and wherein said torque soft zone (2.2) of said spar means comprises a plurality of mutually separated strands (2.2.1) bridged by said beam means (6), said torque soft zone (2.2) having, due to said mutually separated strands (2.2.1), a torsion yieldability higher than said given torsion yieldability.

2. The rotor structure of claim 1, wherein said mutually separated strands (2.2.1) are separated by two longitudinal gaps (2.2.2) intersecting each other, said gaps extending in the respective longitudinal central planes of the torque soft zone (2.2).

3. The rotor structure of claim 1 or 2, wherein said strands are sufficiently separated from one another so that contact between the strands is prevented when the strands are twisted by a torque load applied to the respective wing blade means.

4. The rotor structure of claim 1, wherein said bearing means comprise radial bearing means made of elastomeric material.

5. The rotor structure of claim 4, wherein each of said radial bearing means comprises two halves.

6. The rotor structure of claim 1, wherein said bending stiff beam means (6) comprise substantially the shape of a sleeve, said spar member extending through said sleeve with its torque soft zone.

7. The rotor structure of claim 6, wherein said sleeve forming the bending stiff beam means comprises a longitudinal slot extending at least in one of its sides so that said one side is substantially open along its entire length, said one side extending substantially perpendicularly to the radial plane of the rotor.

8. The rotor structure of claim 1, wherein said spar means comprise a plurality of spaced strands extending from one wing blade to the other wing blade of a pair of wing blades, said strands forming gaps therebetween, and filler means (2.2.3) in said gaps except in said torque soft zone (2.2), said filler means stiffening said spar means against bending except in said torque soft zone.

* * * * *